(No Model.) 4 Sheets—Sheet 3.
W. B. DEMING, S. W. HARMAN & F. H. ROMANS.
MAIL BAG CATCHER AND DELIVERER.
No. 544,885. Patented Aug. 20, 1895.
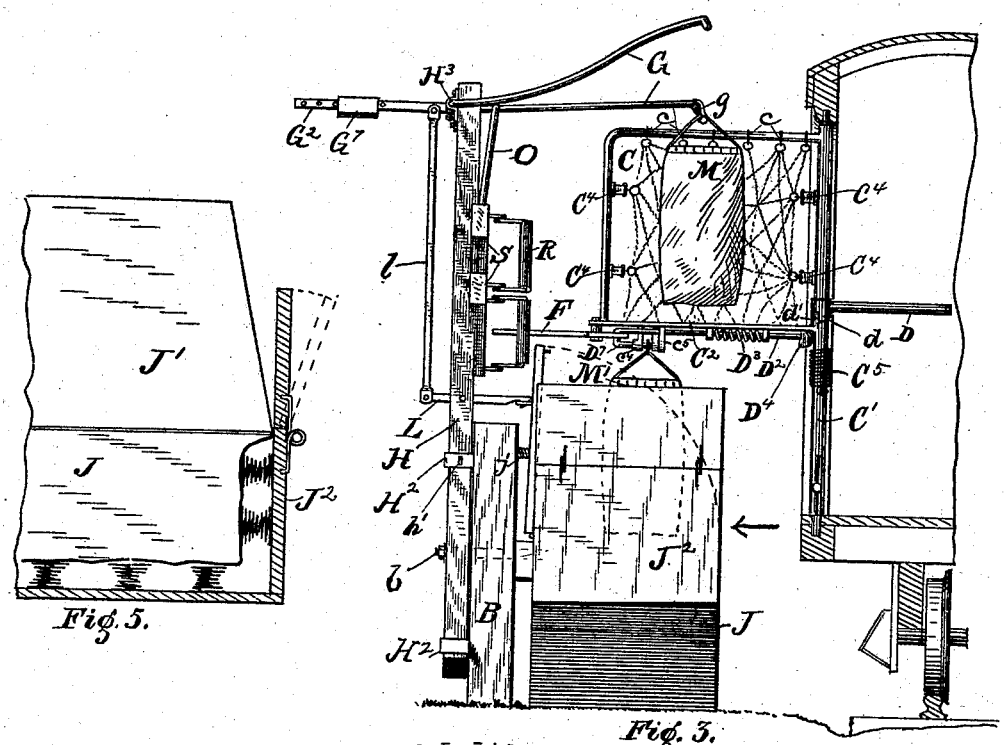
Fig. 5.
Fig. 3.
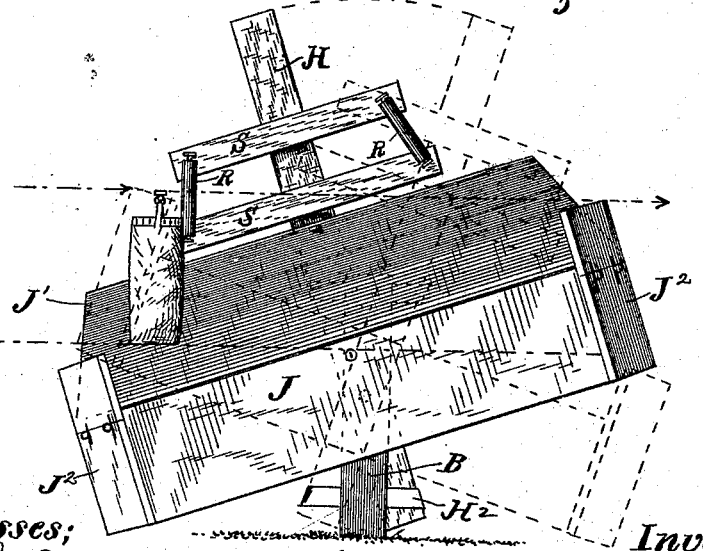
Fig. 4.
Witnesses:
Inventors,
William B. Deming,
Samuel W. Harman,
Freeland H. Romans
By their Attorney (No Model.) 4 Sheets—Sheet 4.
W. B. DEMING, S. W. HARMAN & F. H. ROMANS.
MAIL BAG CATCHER AND DELIVERER.
No. 544,885. Patented Aug. 20, 1895.
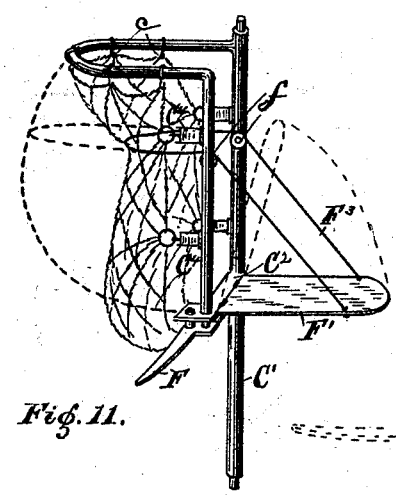
Fig. 11.
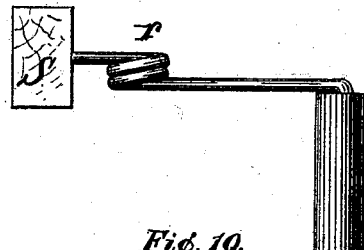
Fig. 10.
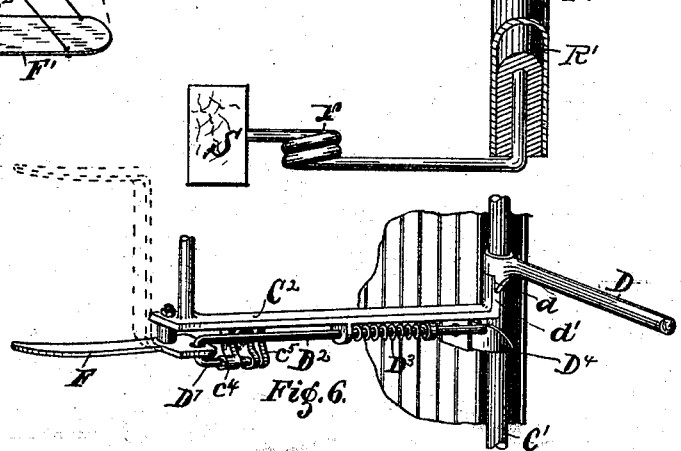
Fig. 6.
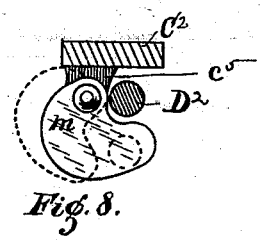
Fig. 8.
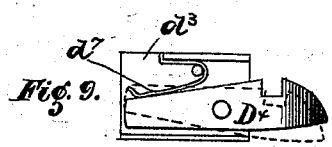
Fig. 9.
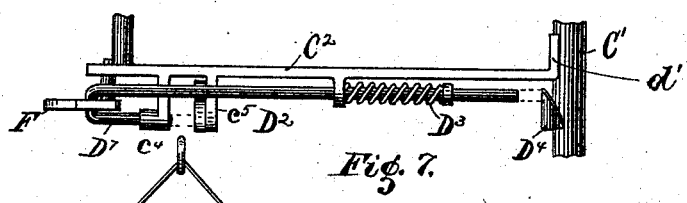
Fig. 7.
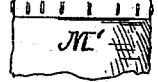
Witnesses:
Inventors,
William B. Deming,
Samuel W. Harman,
Freeland H. Romans,
By their Attorney Joseph A. Minturn

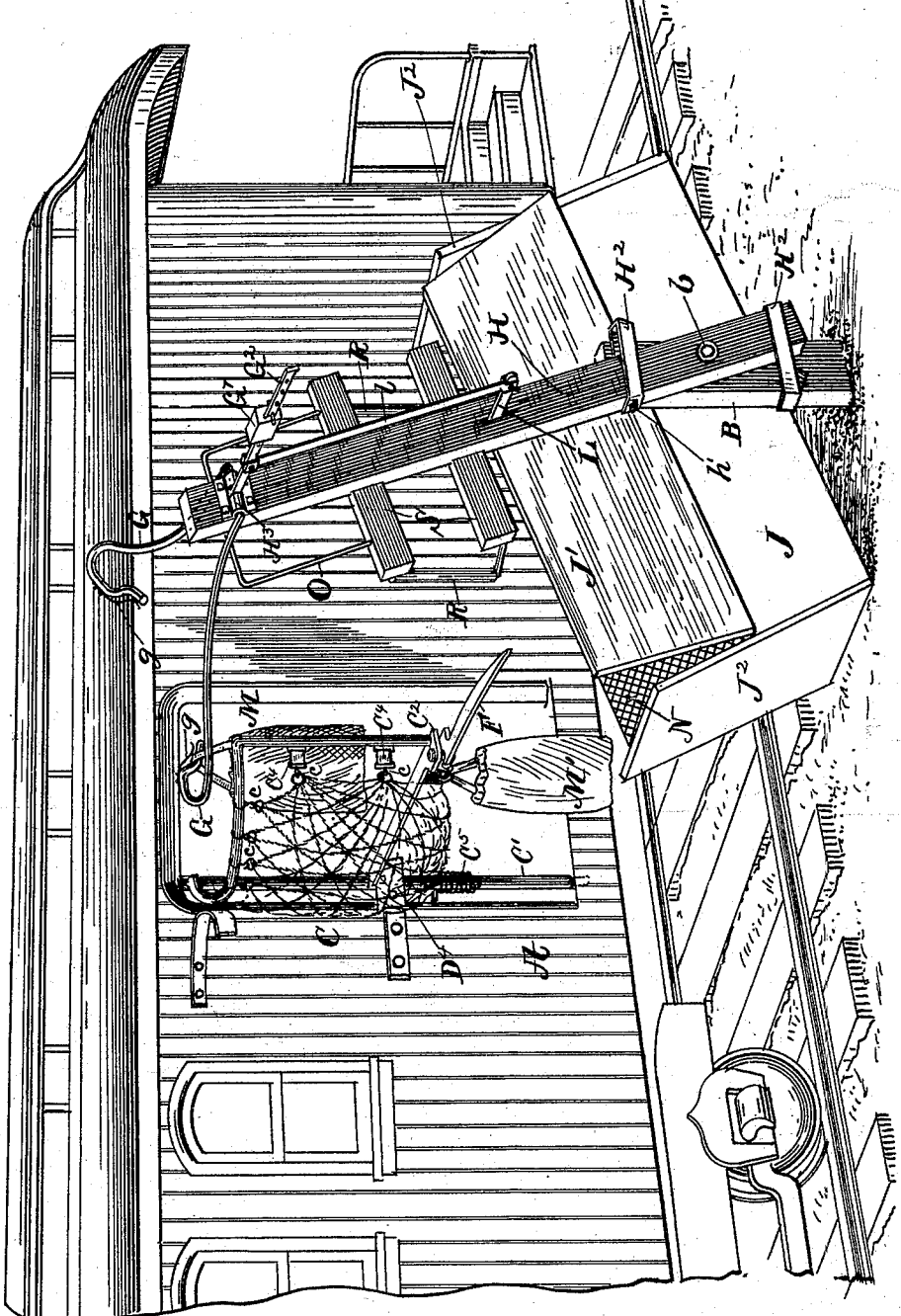

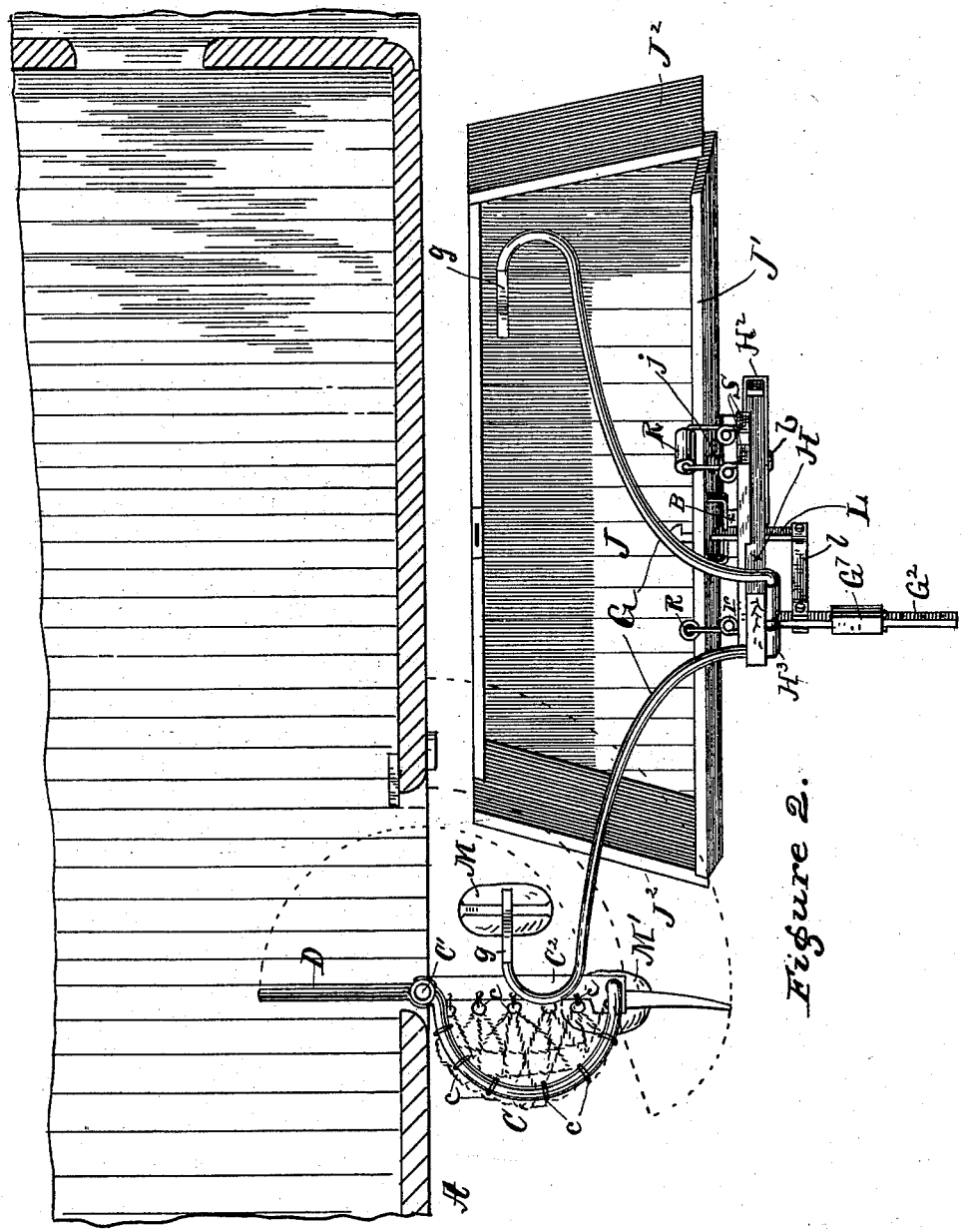

UNITED STATES PATENT OFFICE.

WILLIAM B. DEMING, SAMUEL W. HARMAN, AND FREELAND H. ROMANS, OF BENTONVILLE, ARKANSAS.

MAIL-BAG CATCHER AND DELIVERER.

SPECIFICATION forming part of Letters Patent No. 544,885, dated August 20, 1895.

Application filed October 15, 1894. Serial No. 525,923. (No model.)

*To all whom it may concern:*

Be it known that we, WILLIAM B. DEMING, SAMUEL W. HARMAN, and FREELAND H. ROMANS, citizens of the United States, residing at Bentonville, in the county of Benton and State of Arkansas, have invented certain new and useful Improvements in Mail-Bag Catchers and Deliverers; and we do hereby declare the following to be a full, clear, and exact description of the invention, such as will enable others skilled in the art to which it appertains to make and use the same.

The objects of this invention are to provide an apparatus to be used in connection with postal cars in motion for catching and delivering mail-sacks without slacking the speed of the car; that will operate equally well on any kind of a sack and at any rate of speed of the car; to provide an apparatus so constructed that the mail-sack to be delivered can be hung in place and the catcher set at an expenditure of but a few seconds of time, and in which the mail-clerk can go on with his work and his mail be automatically caught and put within easy reach and the outgoing sack delivered within a closed and self-locking receptacle, where it will be safe from mud, water, and petty theft, and all danger to the sack of its being drawn under the wheels of the train by the suction of the rapidly-moving cars wholly obviated.

The object, also, is to prevent damage to the sack and its contents caused by the impact in receiving or delivering the sack and to prevent the destruction of valuable mail-matter, now frequently caused by the failure of the present mechanism to catch the sack, which is frequently dropped and the sack and contents ground to pieces beneath the car-wheels.

The object, further, is to relieve the clerks from exposure to danger and to provide a construction that will be cheap to manufacture and can be applied to postal cars now in use without radical changes being made in said cars.

We accomplish the objects of this invention by the mechanism illustrated in the accompanying drawings, in which—

Figure 1 is a perspective view of the major portion of a postal car equipped with that part of our apparatus belonging thereto and the other portion thereof being also shown in perspective alongside the track in proper position for use therewith. The view shows the mechanism and sacks in position just preceding the moment of the transfer of the sacks. Fig. 2 is a horizontal sectional view through the postal car, showing the apparatus alongside the track in top plan; Fig. 3, a detail transverse section through said car, looking toward the rear end of the car and showing the catching and delivering apparatus in elevation and set preparatory to a transfer of sacks, as shown in Fig. 1; Fig. 4, a side elevation of the crane and receptacle to receive the sack, looking in the direction of the arrow in Fig. 3, and shows the sack to be delivered just at the moment preceding its release. The dotted lines in this figure show the opposite position of the crane and box, such as will be assumed when the train is approaching from the opposite direction. Fig. 5 is a detail in vertical section of a portion of the box to receive the outgoing sack, and shows the springs and cushions to lessen the force of the impact of the sack. Fig. 6 is a detail in perspective of the mechanism for locking and for releasing the catching and delivering device; Fig. 7, a detail in front view of the locking-bar, showing it drawn back into position to release the sack and catching-receptacle and showing the sack just released; Fig. 8, an enlarged detail of the mechanism by which the sack to be discharged is admitted to the suspending-bar without withdrawing the bar for the adjustment of the sack over the end of the bar; Fig. 9, a detail of the catch to engage the locking-bar shown in Figs. 6 and 7; Fig. 10, a detail of striking-bar on the crane, against which the tripping-lever contacts in releasing the mechanism of the catcher and deliverer; Fig. 11, a detail in perspective of catching-receptacle, showing hinged side to close entrance side of receptacle after sack is received within receptacle.

Similar letters refer to like parts throughout the several views of the drawings.

In said drawings, the portions marked A represent the postal car, which is in itself of any usual or desired construction.

B represents the post supporting the portion of the apparatus alongside the track.

C is the receptacle, which is hinged to the car at one side of the door or other opening leading into the car, and is adapted to be swung outwardly so as to intercept the sack to be caught. This receptacle consists of a netting preferably made from vegetable fiber, such as cotton or flax, and will be secured by connecting the margins of the netting to the four sides of the metal frame, as shown in Figs. 1 and 3. The vertical post C' forms one of the sides of the frame, and the post is continued a suitable distance above and below the frame, and is provided with contracted ends which enter sockets in the door-sill and frame and forms the hinge upon which the receptacle will turn. The lower side of the frame is formed by the horizontal bar $C^2$, which is bolted or otherwise secured at one of its ends to the post C'. The upper and the outer sides of the frame will be formed from a continuous bar of iron bent at right angles to form the two sides, and having one of its ends secured to the bar $C^2$ and the other end secured to the post C'. The netting will be secured to the vertical sides of the frame by elastic connections $C^4$, which may be either coiled or other forms of metal springs, or may be bands of rubber, such as is shown in the drawings. Snap-hooks $c$ will be provided in the fastenings to enable the netting to be quickly replaced when damaged. A coiled spring $C^5$, having one end secured to the post C' and the other end bearing against the car, will force the receptacle around into a closed position.

D is a lever pivotally secured to the post C' and having an under side lug $d$ to engage the lug $d'$ of the post. When the two lugs $d$ and $d'$ are in engagement, the lever will be approximately at right angles to the frame and will enable the mail-clerk to overcome the tension of the spring $C^5$ by suitable pressure applied to the lever and force the receptacle into its open position preparatory to catching the sack. The angle of the lever with the receptacle enables the clerk to perform his duties without danger or inconvenience. The mechanism by which the frame will be held in open position is shown in Figs. 6, 7, and 9, in which $D^2$ represents a horizontal locking-bar secured to the under side of the lower bar $C^2$ of the frame and provided with the spring $D^3$, by which the bar will be forced inwardly. $D^4$ is a catch pivotally secured within the case $d^3$ and the case secured to the side of the car. The spring $d^7$ presses the catch upwardly, as shown in Fig. 9. By the construction here shown, the frame will be self-locking when it is brought into the position required to catch the sack. As soon as the mail-sack is caught within the receptacle the latter should immediately close, and the mechanism by which the receptacle is released at the proper moment will consist of the trip-lever F, which will be pivoted to the bar $C^2$ and will be connected to the outer end of the horizontal locking-bar $D^2$. The outer end of the trip-lever may be extended in a straight line, so as to contact with a stationary releasing-bar alongside the track, or the outer end of the trip-lever may be cranked up, as shown by the dotted lines, Fig. 6, to prevent contact with pedestrians on the platforms at the various stations. In both constructions the locking-bar $D^2$ is drawn out of locking-contact with its catch by the backward movement of the outer arm of the trip-lever, and the frame will then be closed by the action of the spring $C^5$.

F' (shown in Fig. 11) represents a hinged plate, which will be thrown up so as to hold the sack from dislodgment after it has been deposited within the receptacle.

$F^3$ represents a flexible cord, which will be attached at each end to the plate F', and passing over the pulleys $f$ on each side of the frame, as clearly shown in the drawings, will encircle the net by passing on the outside of same. It will be seen that the impact of the incoming sack will force the net and cord back into the position shown in the dotted lines and will draw the plate F' up into the position also shown by the dotted lines, thereby closing the receptacle. The netting is used in the construction of the receptacle in order to afford a yielding resistance to the mail-sack, in order not to damage the sack and contained mail-matter by the impact in catching the sack. This yielding resistance is increased by using the spring connections between the netting and frame.

G represents the arms of the crane to support the mail-sack which is to be caught by the passing car, (an arm being provided for each direction in which the train moves,) and these arms are so constructed that the sack, when suspended from the end of either of the arms, will be drawn off over the end of the respective arm. The locking-spring $g$ will prevent the accidental removal of the sack. The mechanism for supporting the arms and shifting them into proper position for service will be hereinafter explained. The sack M when suspended from the arm G will be within the path of the receptacle C and the sack will be pushed off of its arm by the upper horizontal arm of the frame. This upper arm will be curved to the rear, so as to cause the sack to be deposited well within the netting when released.

H represents the post which supports the arms G. The post H is pivotally secured to the stationary post B by means of the pivot $b$, and is allowed a vertically-reciprocating adjustment subject to the control of the guides $H^2$. The guides $H^2$ are two in number and are placed on each side of the pivot $b$. The guide will preferably be of strap-iron and will be secured to the post B.

J is the receptacle or box into which the mail-sack to be delivered is placed. It is a long and narrow box and is connected with the post H by means of the pivot $b$, so that when the angle of inclination of the post is changed the box will be correspondingly tilted in the same direction. The box is provided with the hinged lid J' and has a spring-lock by which the lid will be secured. A spring $j$ secured to the post H will close the lid unless the latter is held open by a fastening device. The ends $J^2$ of the box are projected above the level of the lid for the purpose of intercepting the mail-sack to be delivered and prevent its being carried beyond the limits of the box. The mail-sack M' will be suspended from a hook formed by making a return bend in the outer end of the locking-bar $D^2$.

$D^7$ represents this hook, which will be supported by the depending arm $c^4$, integral with the bar $C^2$, through which the hooked end will be projected. When the sack M' is in suspension the end of the hook will abut against a second depending arm $c^5$. For greater convenience in placing the sack on the hook a pivoted lock $m$ is provided, which can be raised to allow room for the insertion of the ring of the mail-sack between the end of the hook and the arm $c^5$ and thence over the end of the hook without withdrawing the hook. This lock is weighted so as to act by gravity to lock the sack in place. It will at once be seen that when the bar $D^2$ is drawn outwardly by the tripping-lever F the support for the sack M' will be withdrawn and the sack will drop by its own weight. This action will be so timed as to cause it to fall into the underlying box. The angle of inclination of the box J will be such that the sack will pass over the first end of same, but the other end of the box will be so elevated as to keep the sack from passing out over said end. By pivoting the box as described and shown in the drawings it can be set to suit the direction of the approaching car. To prevent damage to the sack and contents the ends of the box may be divided and the upper section provided with a spring-hinge that will allow the upper end to "give" somewhat under the impact. The inside of the box may also be provided with cushions, such as shown in Fig. 5, which will also relieve the severity of the impact. As shown in Fig. 2, the ends will also be placed at an angle, widest on the side next to the post H, in order to keep the sack from bounding out when delivered at a high speed. A netting N, secured to the box on the side next to the track, will also keep the sack from being thrown out.

The arms G will form the bifurcated end of a lever, which will be pivotally secured to the post H at $H^3$, and of which the outer end $G^2$ will be weighted. The weight $G^7$ will be sufficient to elevate the arms G the moment the mail-sack is removed by the catcher. The lid J' of the box will be held open by a hook on the end of the lever L. The lever L will be pivotally secured to the post H, and its outer end will be connected with the lever $G^2$ by means of the connecting-rod $l$. By this arrangement, when the mail-sack M is removed by the catcher the weighted arm $G^2$ will drop, the hook securing the lid will be raised out of engagement, and the lid will be closed by the spring $j$. While this will be taking place the sack M' will be deposited in the box and will be retained therein by the closing of the spring-locked lid.

O is a support for the arms G when sustaining the mail-sack. The post H will be locked by the key $h'$ on the post, which will be projected through corresponding slots in the guide-bars. Any convenient lock to prevent the withdrawal of the staple may be used for a key.

The striking-bars R will be supported upon the cross-arms S, the cross-arms S being secured to the post H. These bars stand vertically and act alternately, or according to the direction of the approaching train, to trip the lever F. They are placed, by the construction made possible by the tilting support H, so that when one of the bars is in contacting position the other bar will be elevated out of range of the lever F. To lessen the force of the blow of the lever F upon the bars, coiled springs will be interposed, as shown at $r$. Rollers R', mounted upon the bars, will still further increase the efficiency of the construction, and if desired these rollers may be covered with rubber to additionally facilitate the action.

We claim—

1. The combination, with a postal car, of a receptacle hinged opposite an opening into said car, whereby the receptacle may be swung into a position approximately at right angles to the side of the car, a catch to hold the receptacle in this open position and a tripping lever or arm connected with the catch and adapted to strike an operating device alongside the track, substantially as set forth.

2. The combination, with a postal car, of a netting of woven fiber, a frame to support said netting and hinged opposite an opening into the car, whereby the frame and attached net may be swung into a position to intercept a mail bag suspended alongside the track, a catch to hold the frame in its open position, and a trip to liberate the catch by contact with a device alongside the track, all substantially as described and specified.

3. The combination, with a postal car, of a frame hinged opposite an opening into said car, whereby the frame may be swung into a position approximately at right angles to the side of the car to intercept a mail bag suspended alongside the track, means for locking the frame in an open position and of automatically unlocking and closing it, a netting of any suitable material secured to the frame by means of elastic connections, whereby the yielding resistance of the netting in stopping the bag, will be increased, in the manner substantially as described and specified.

4. In a mail bag catcher, a spring actuated receptacle hinged to the car so as to be opened into a position approximately at right angles to the car, a spring catch to automatically lock the receptacle in its open position, a spring actuated tripping lever secured to the frame work of the receptacle and connected with the catch and adapted to open the catch and liberate the receptacle by the contact of the tripping lever with an operating device alongside the track, substantially as specified.

5. In a mail bag catching receptacle, a frame resiliently hinged to the car and a netting secured to said frame by means of elastic fasteners whereby the yielding resistance of the receptacle will be increased, substantially as and for the purposes set forth.

6. A mail bag catching receptacle having a flexible and resilient surface to contact with the bag, said receptacle being adapted to be set approximately at right angles to the side of the car when in position to receive the bag, a catch to hold the receptacle in a set position, an arm or lever pivotally secured to the frame of the receptacle and connected with the catch and adapted to contact with an operating device alongside the track and release the receptacle, and a plurality of springs variously arranged to move the receptacle forward and around toward the car, whereby the bag will be more securely caught and will be brought into a position easily accessible from within the car, substantially as described.

7. The combination, with a postal car, of an arm pivotally secured thereto so as to have a horizontal lateral adjustment, a trip lever pivotally secured to the arm, a spring actuated bar secured to the trip lever and adapted to support the mail bag which will be suspended therefrom, said bar being withdrawn so as to release the bag by the contact of the trip lever with an operating device located alongside the track.

8. In a mail pouch delivering apparatus, the combination with the postal car, of an arm pivoted thereto, so as to have a horizontal lateral movement, a spring to force the arm into a closed position parallel with the side of the car, and a catch to hold the arm in a set position approximately at right angles to the car, a reciprocating bar to hold the bag by suspension therefrom, a trip lever secured to the arm and secured to the bar from which the mail bag is suspended and also with the catch for locking the arm and adapted to simultaneously liberate the arm and release the bag by a suitable movement of the trip lever, in the manner substantially as described and specified.

9. The combination, with a spring actuated, horizontally reciprocating device for delivering and catching mail bags and having a spring actuated trip lever to liberate the mechanism of said device, of a striking bar located alongside the track within the path of said trip lever, said striking bar having spring connections with its support, whereby a yielding resistance of the striking bar will be secured, for the purposes specified.

10. The combination, with a spring actuated, horizontally reciprocating device for delivering and catching mail bags and having a spring actuated trip lever to liberate the mechanism of said device, of a striking bar located alongside the track within the path of said trip lever, said striking bar having a cover of elastic material and having spring connections with its support, whereby a yielding resistance of the striking bar will be secured, for the purposes specified.

11. The combination, with a device for delivering and catching mail bags, having its operative mechanism set in motion by a trip lever, of striking bars in duplicate attached to a hinged support adapted to be adjusted in a vertical plane parallel with the car, whereby either one of the striking bars can be successively brought into the path of the trip lever or removed, for the purpose substantially as described and specified.

12. The combination, with a device for delivering mail bags, of a longitudinal centrally pivoted receptacle underlying the bag when released, and having its forward end projected upwardly to intercept the path in which the suspended bag was moving prior to its release, as and for the purpose set forth.

13. In a mail bag deliverer, the combination with mechanism for suspending and liberating the bag, of a receptacle placed longitudinally of the track under the place where the bag is released, said receptacle having upwardly projected ends and said receptacle being centrally pivoted to a fixed support whereby it may be inclined toward the approaching bag thereby depressing the end of the receptacle nearest the approaching bag so the bag can pass over the end without conflict therewith and whereby the opposite end of the receptacle will be projected into the path in which the suspended bag was moving prior to its release, substantially as and for the purposes described.

14. The combination, with a device for delivering mail bags having its operative mechanism set in motion by a trip lever coming in contact with a striking bar located alongside the track, of a longitudinal centrally pivoted receptacle underlying the bag when released, and having its forward end projected upwardly to intercept the path in which the suspended bag was moving prior to the release of the bag, as and for the purposes set forth.

15. In a mail bag deliverer, a receptacle to receive the bag having an elastically yielding upwardly projected portion intercepting the path in which the bag was moving prior to its release from the delivering mechanism of the car, substantially as described and for the purposes set forth.

16. The combination, with a device for delivering mail bags, having its operating mechanism set in motion by a trip lever coming in contact with a striking bar located alongside the track, of striking bars in duplicate attached to a hinged support, a longitudinal receptacle also attached to said hinged support and underlying the bag when released, said receptable being at an angle inclined toward the approaching bag whereby the bag will pass freely over the near end of the receptacle and will be intercepted by the opposite end of same, said striking bars and receptacle being secured to the hinged support whereby by shifting the support, the receptacle and striking bars will be adjusted to operate the mechanism when the car is moving in an opposite direction.

17. The combination, with a device for delivering mail bags of a receptacle to receive the bag, said receptacle having a hinged lid and a spring lock to secure the lid when closed and mechanism actuated by the passing car whereby the lid will be automatically closed, substantially as described.

18. The combination, with a postal car and mechanism for supporting a mail bag to be delivered and for liberating said bag of a receptacle located so as to receive the dropped bag, a hinge to said receptacle, a post contiguous to said receptacle and having an arm to support the ingoing bag, said arm being pivotally secured to said post and mechanism connecting the opposite end of said arm with the lid of the receptacle whereby, when the arm is released by the removal of the ingoing bag, the lid of the box will be released and will close by gravity in the manner substantially as shown and for the purposes specified.

19. The combination, with a device for delivering and catching mail bags, having its operative mechanism set in motion by a trip lever, of striking bars in duplicate, attached to a hinged support adapted to be adjusted in a vertical plane parallel with the car whereby either one of the striking bars can be successively brought into the path of the trip lever or removed to suit the direction of the movement of the car.

20. The combination with the receptacle C and the car A of the lever D, adjustably secured to the hinge post of the receptacle and having an under side lug $d$ to engage a lug $d'$ on the post, whereby in certain vertical adjustments of the lever a rotative movement may be transmitted to the receptacle by pressure upon the lever substantially as and for the purposes described.

21. The combination, with the stationary post B, of the post H pivotally secured to the post B and the guide bars $H^2$ secured to the post B and encircling the post $H^2$ and forming guides and stops whereby the direction and amount of movement of the post H will be regulated, said bars having slots and the post having keys registering with said slots and adapted to be inserted therethrough substantially as described and for the purposes set forth.

22. In a mail bag catcher, the combination with a receptacle to receive the bag, of a hinged plate adapted to close the receptacle, a flexible cord suspended across the mouth of the receptacle, and having its ends secured to the opposite sides of the plate whereby the plate will be closed over the mouth of the receptacle by the impact of the bag against the cord, substantially as described.

In testimony whereof we affix our signatures in presence of two witnesses.

WILLIAM B. DEMING.
SAMUEL W. HARMAN.
FREELAND H. ROMANS.

Witnesses:
JOSEPH A. MINTURN,
C. R. CRAIG.